(12) United States Patent
Nishigori

(10) Patent No.: US 9,565,353 B2
(45) Date of Patent: Feb. 7, 2017

(54) IMAGE PICKUP APPARATUS, IMAGE PICKUP SYSTEM, METHOD OF CONTROLLING IMAGE PICKUP APPARATUS, AND NON-TRANSITORY COMPUTER-READABLE STORAGE MEDIUM

(71) Applicant: CANON KABUSHIKI KAISHA, Tokyo (JP)

(72) Inventor: Hidetoshi Nishigori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 14/484,531

(22) Filed: Sep. 12, 2014

(65) Prior Publication Data
US 2015/0077621 A1    Mar. 19, 2015

(30) Foreign Application Priority Data

Sep. 18, 2013  (JP) .................................. 2013-193480
Sep. 1, 2014   (JP) .................................. 2014-177163

(51) Int. Cl.
*H04N 5/232*   (2006.01)

(52) U.S. Cl.
CPC ................................ *H04N 5/23212* (2013.01)

(58) Field of Classification Search
CPC .................................................. H04N 5/23212
USPC ........................................ 348/349; 396/104
See application file for complete search history.

(56) References Cited

U.S. PATENT DOCUMENTS

| | | | | |
|---|---|---|---|---|
| 5,502,311 A | * | 3/1996 | Imai | G03F 7/70858 250/548 |
| 5,995,767 A | * | 11/1999 | Lee | G02B 7/28 396/121 |
| 2007/0286590 A1 | * | 12/2007 | Terashima | G03B 3/00 396/125 |
| 2008/0031611 A1 | * | 2/2008 | Konishi | G03B 13/32 396/102 |
| 2008/0159727 A1 | * | 7/2008 | Hamamura | G02B 7/102 396/104 |

FOREIGN PATENT DOCUMENTS

JP    2009-069740 A    4/2009

* cited by examiner

*Primary Examiner* — Joel Fosselman
(74) *Attorney, Agent, or Firm* — Cowan, Liebowitz & Latman, P.C.

(57) ABSTRACT

An image pickup apparatus includes an image pickup element configured to perform photoelectric conversion on an optical image obtained through an image pickup optical system to generate an image signal, a focus detection unit configured to perform focus detection based on the image signal, a determination unit configured to determine an object in a screen, a calculation unit configured to calculate an in-focus position based on information of the object determined by the determination unit, and a control unit configured to perform the in-focus control based on the in-focus position calculated by the calculation unit.

17 Claims, 6 Drawing Sheets

IMAGE PICKUP APPARATUS, IMAGE PICKUP SYSTEM, METHOD OF CONTROLLING IMAGE PICKUP APPARATUS, AND NON-TRANSITORY COMPUTER-READABLE STORAGE MEDIUM

BACKGROUND OF THE INVENTION

Field of the Invention

The present invention relates to an image pickup apparatus configured to perform focusing based on an image signal from an image pickup element that performs photoelectric conversion on an object image.

Description of the Related Art

Conventionally, there has been disclosed an image pickup apparatus including any of various kinds of automatic focusing apparatuses utilizing optical properties. Japanese Patent Laid-open No. 2009-069740 discloses an image pickup apparatus with an improved focusing accuracy over an entire image pickup screen.

However, the image pickup apparatus disclosed in Japanese Patent Laid-open No. 2009-069740 calculates a correction amount of an in-focus position based on a detected value of a contrast peak position difference between a ranging area in a central portion and a ranging area in a peripheral portion and a previously stored value of the contrast peak position difference, thereby performing drive control of a focus lens. In other words, in the image pickup apparatus of Japanese Patent Laid-open No. 2009-069740, the correction amount of the in-focus position does not depend on a focal length or an object distance. Such a configuration can provide an image with its resolution balanced between at the central and peripheral portions of the screen. However, when a main object such as a person's face of which image a photographer wants to capture is not at screen positions such as the central and peripheral portions where resolution is balanced, good resolution cannot be obtained for the main object.

SUMMARY OF THE INVENTION

The present invention provides an image pickup apparatus, an image pickup system, a method of controlling the image pickup apparatus, and a non-transitory computer-readable storage medium that are capable of setting an in-focus position appropriate for the state of a main object on a screen.

An image pickup apparatus as one aspect of the present invention includes an image pickup element configured to perform photoelectric conversion on an optical image obtained through an image pickup optical system to generate an image signal, a focus detection unit configured to perform focus detection based on the image signal, a determination unit configured to determine an object in a screen, a calculation unit configured to calculate an in-focus position based on information of the object determined by the determination unit, and a control unit configured to perform in-focus control based on the in-focus position calculated by the calculation unit.

An image pickup system as another aspect of the present invention includes an image pickup optical system and an image pickup apparatus.

A method of controlling an image pickup apparatus as another aspect of the present invention includes the steps of performing photoelectric conversion on an optical image obtained through an image pickup optical system to generate an image signal, performing focus detection based on the image signal, determining an object in a screen, calculating an in-focus position based on information of the object, and performing in-focus control based on the in-focus position.

A non-transitory computer-readable storage medium as another aspect of the present invention stores a program which causes a computer to execute the method of controlling an image pickup apparatus.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Figure 1:
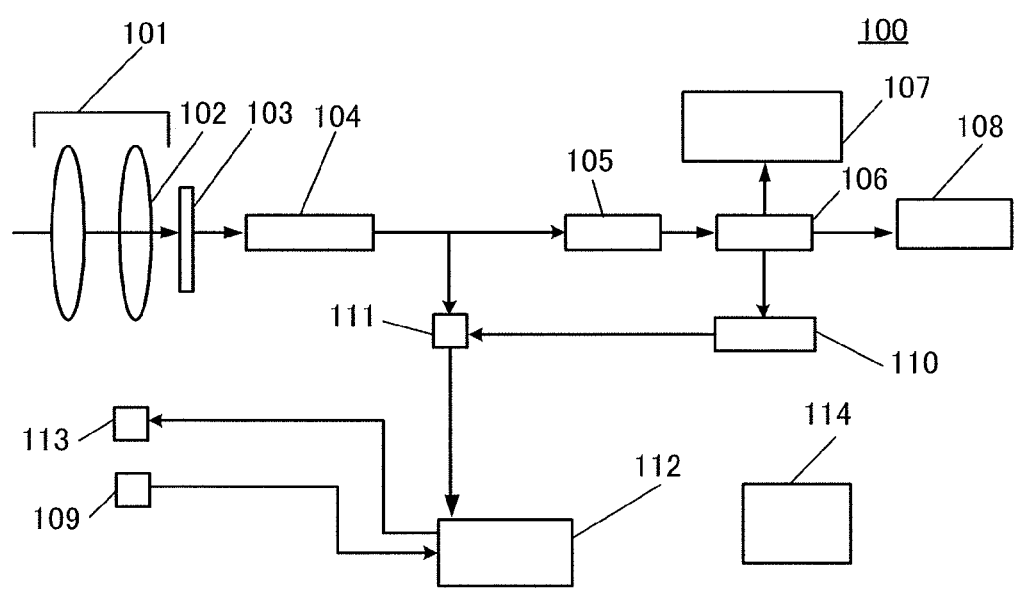
FIG. 1 is a block diagram of an image pickup apparatus in an embodiment of the present invention.

First, referring to FIG. 1, an image pickup apparatus (image pickup system) in an embodiment of the present invention will be described. FIG. 1 is a block diagram of an image pickup apparatus 100. The image pickup apparatus 100 includes an automatic focusing apparatus.

An image pickup optical system 101 forms an object image (optical image). An image pickup element 103 includes a CCD or CMOS sensor and performs photoelectric conversion on a light ray (optical image) obtained through the image pickup optical system 101 to generate an image signal. An A/D convertor 104 converts an analog signal (the image signal) obtained from the image pickup element 103 into a digital signal. A memory 105 (RAM) temporarily stores the digital signal converted by the A/D convertor 104. An image processing unit 106 performs image processing such as white balance on the signal temporarily stored in the memory 105. An electronic finder 107 includes a small liquid crystal screen and displays an image generated by the image processing unit 106. An image recording unit 108 converts the image (a digital image signal) generated by the image processing unit 106 into a format such as JPEG and records it.

A determination unit 110 determines a main object in an image (in a screen). More specifically, the determination unit 110 determines at least one of the existence of the object (main object) in the screen, the number thereof, the position thereof, and the size thereof in the screen based on, for example, the signal (image signal) obtained from the image processing unit 106. An extraction unit 111 (focus detection unit) extracts a defocus detection signal (focus detection signal) in a defocus detection area (focus detection region). More specifically, the extraction unit 111 determines the defocus detection area based on information from the determination unit 110 and performs defocus detection (focus detection) based on the digital signal (image signal) from the A/D convertor 104.

A calculation unit 112 calculates (adjusts) an in-focus position based on information (for example, the position of the object existing in the screen and the number thereof) of the object determined by the determination unit 110. More specifically, the calculation unit 112 calculates (adjusts) the in-focus position based on the defocus detection signal extracted by the extraction unit 111 and a determination result by the determination unit 110 (for example, the position of the object existing in the screen and the number thereof). A focus control unit 113 (control unit) performs drive control of a focus lens 102. In particular, in the present embodiment, the focus control unit 113 performs in-focus control based on the in-focus position calculated by the calculation unit 112. A detection unit 109 detects the zoom position and the aperture amount of the image pickup optical system 101. A system controller 114 (camera CPU) controls operation of each component of the image pickup apparatus 100. The automatic focusing apparatus is constituted by the determination unit 110, the extraction unit 111, the calculation unit 112, and the focus control unit 113.

In the present embodiment, the image pickup apparatus 100 integrally includes an image pickup apparatus body including the image pickup element 103 and the image pickup optical system 101, but is not limited thereto. The present embodiment is also applicable to an image pickup system including the image pickup apparatus body including the image pickup element 103 and a lens apparatus (image pickup optical system) detachable from the image pickup apparatus body.

Subsequently, the operation of the image pickup apparatus 100 in the present embodiment will be described. When a power switch (not illustrated) of the image pickup apparatus 100 is turned on, power is supplied to each component constituting the image pickup apparatus 100. The light ray (optical image) from the object transmitting through the image pickup optical system 101 is imaged on the image pickup element 103. Then, the analog signal (an electric signal) on which photoelectric conversion is performed by the image pickup element 103 is output to the A/D convertor 104. The A/D convertor 104 converts the analog signal (an analog image signal) from the image pickup element 103 into the digital signal (digital image signal). The digital image signal is temporarily stored in the memory 105. An image (the digital image signal) stored in the memory 105 is input to the image processing unit 106, and the image processing such as white balance is performed on the image.

The electronic finder 107 displays the image on which the image processing such as white balance is performed by the image processing unit 106.

The image pickup apparatus 100 repeats the processing described above until receiving a signal from a shutter switch SW1 (that is, a signal notifying half-pressing of the shutter switch). On the other hand, when having received a signal from the shutter switch SW1, the image pickup apparatus 100 performs AE processing and focusing (control of the in-focus position) and acquires information of optimum exposure condition and focusing. To acquire the information of focusing, the determination unit 110 determines the existence of the main object in the screen (in the image), the position thereof, and the number thereof based on the signal input from the image processing unit 106. The determination unit 110 determines the main object based on, for example, feature amounts such as the size, color, and shape of the object.

The extraction unit 111 determines the defocus detection area based on the information from the determination unit 110 and performs defocus detection on the digital image signal from the A/D convertor 104. The calculation unit 112 calculates (adjusts) the in-focus position based on the defocus detection signal extracted by the extraction unit 111 and the determination result by the determination unit 110. The focus control unit 113 performs the drive control of the focus lens 102 based on the in-focus position calculated by the calculation unit 112 and adjusts the in-focus position for the object (performs the in-focus control).

The image pickup apparatus 100 performs actual image capturing when having received a signal (that is, a signal notifying full-pressing of the shutter switch) from a shutter switch SW2. At this time, the light ray (optical image) from the object is imaged on the image pickup element 103, and the analog signal on which photoelectric conversion is performed is output from the image pickup element 103 to the A/D convertor 104. The A/D convertor 104 converts the analog signal (analog image signal) input from the image pickup element 103 into the digital signal (digital image signal). The digital image signal is temporarily stored in the memory 105. The image stored in the memory 105 is input to the image processing unit 106, and the image processing such as white balance is performed on the image. An output signal from the image processing unit 106 is input to the image recording unit 108, and the digital image signal is converted into the format such as JPEG and recorded. In the present embodiment, the determination unit 110 may be configured to perform the operation of determining the main object at any time (or continuously) once the power switch is turned on.

The configuration described above allows the adjustment (correction) of the in-focus position depending on the position of the main object existing in the screen and the number thereof when image capturing is performed with the main object determination while there exists a focus difference caused by the curvature of field and inclination between the image pickup optical system and an image pickup surface. Thus, when the image capturing is performed with the main object determination, an image exhibiting good resolution of the main object can be obtained.

Figure 2:
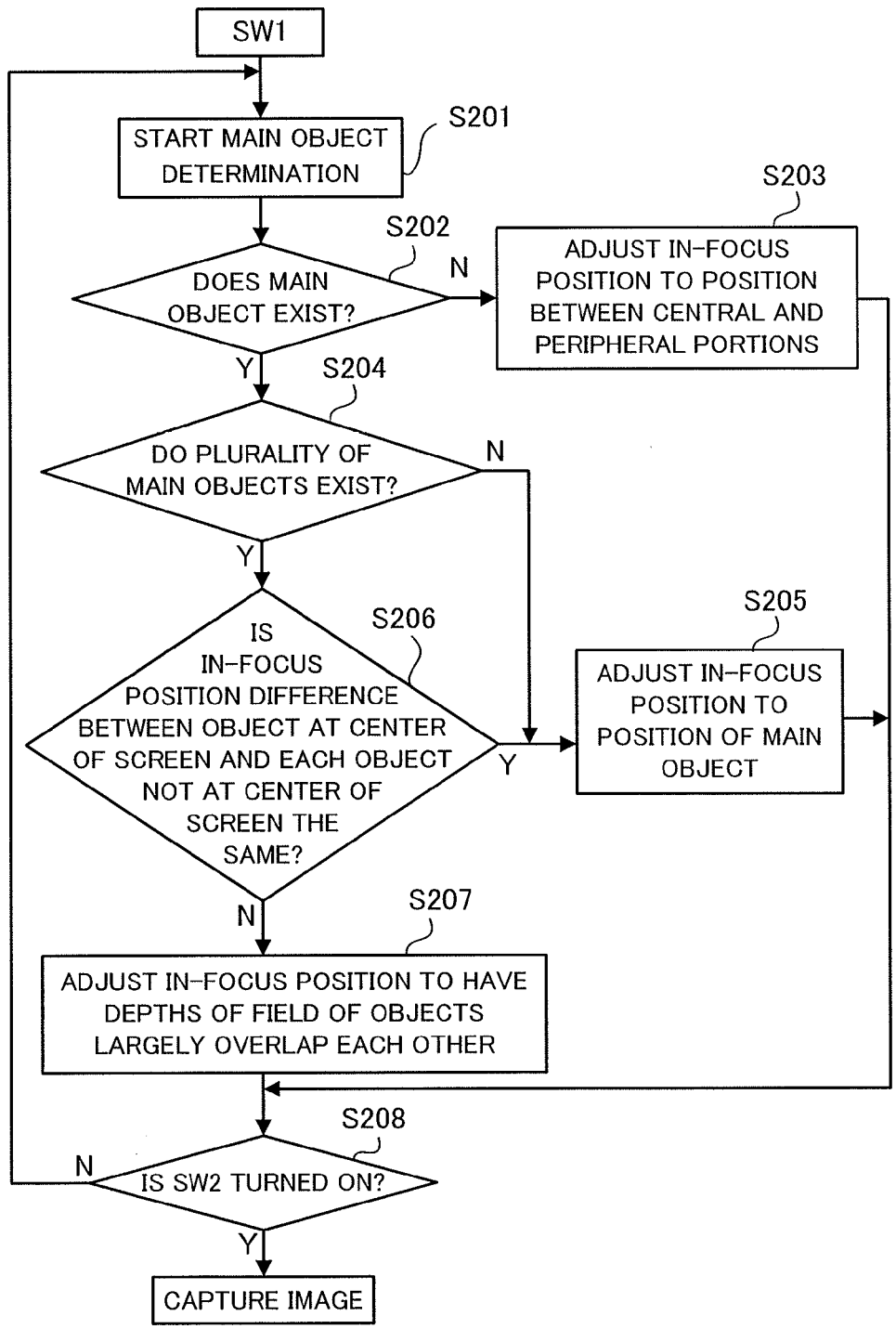
FIG. 2 is a flowchart of a method of adjusting an in-focus position in the present embodiment.

Next, referring to FIG. 2, a method of calculating (adjusting) the in-focus position will be described. FIG. 2 is a flowchart of the method of calculating the in-focus position (method of controlling the image pickup apparatus 100) in the present embodiment. Each step in FIG. 2 is performed by the determination unit 110, the extraction unit 111, the calculation unit 112, or the focus control unit 113 mainly based on a command (instruction) from the system controller 114.

First at step S201, when the shutter switch SW1 of the image pickup apparatus 100 is turned on, the determination unit 110 starts the main object determination. Subsequently at step S202, the determination unit 110 determines whether the object determined as the main object such as the face of a person exists in the screen (in the image) (determines the existence of the main object). When the determination unit 110 determines that no object exists in the screen, the calculation unit 112 adjusts the focus control unit 113 so as to move the in-focus position for a center of the screen of the image pickup optical system 101 away from the position of the image pickup element 103 and to move the in-focus position for a peripheral portion of the screen of the image pickup optical system 101 closer to the position of the image pickup element 103. Then, the flow proceeds to step S203 where the calculation unit 112 calculates an in-focus position for averagely exhibiting good resolution for an object A and an object B positioned at the same object distance, the object A being at a central portion of the screen and the object B being at a peripheral portion of the screen. The focus control unit 113 performs the drive control of the focus lens 102 (performs the in-focus control) based on the calculated in-focus position.

The in-focus position is adjusted (corrected) with taken into account a shift amount (positional difference amount) of an image plane between at the central and peripheral portions of the screen caused by the curvature of field of the image pickup optical system 101 or the inclination between the image pickup optical system 101 and the image pickup element 103, so as to averagely exhibit good resolution for an object A and an object B positioned at the same object distance, the object A being at the central portion of the screen and the object B being at the peripheral portion of the screen. In other words, the calculation unit 112 adjusts the difference between the imaging position of the image pickup optical system 101 as the in-focus position in the screen and the position of the image pickup element 103 caused by the curvature of field of the image pickup optical system 101. Alternatively, the calculation unit 112 adjusts the difference between the imaging position of the image pickup optical system 101 as the in-focus position in the screen and the position of the image pickup element 103 caused by the inclination of the image pickup element 103 with respect to the image pickup optical system 101.

On the other hand, when the object determined as the main object exists at step S202, the flow proceeds to step S204. Then at step S204, the determination unit 110 calculates the number of main objects. When only one main object exists, at step S205, the calculation unit 112 calculates (adjusts) the in-focus position so that best resolution at the position of the main object in the screen is obtained. In other words, when the determination unit 110 determines that only one object exists in the screen, the calculation unit 112 adjusts the in-focus position so as to focus on the one object.

On the other hand, when a plurality of main objects exist at step S204, the flow proceeds to step S206. Then at step S206, for the main objects, the determination unit 110 determines whether the difference between the in-focus position of a main object at the center of the screen and the in-focus position of each of a plurality of main objects not at the center of the screen is the same. When the in-focus position difference from the main object at the center of the screen is the same for each of the main objects not at the center of the screen, the in-focus position is the same for each of the main objects. Thus, the flow proceeds to step S205 where the calculation unit 112 calculates the adjustment amount of the in-focus position so as to cause the in-focus position to be the in-focus position of the main objects and the focus control unit 113 adjusts the in-focus position accordingly. Specifically, cases meant by the wording "the in-focus position difference is the same for each of the main objects" include not only a case of being strictly the same but also a case where the in-focus position for each of the objects is within a predetermined range of the depth of field within which an acceptable resolution is obtained for the object. When the determination unit 110 determines at step S206 that the objects exist in the screen and the in-focus position for each of the objects is within the predetermined range, the calculation unit 112 adjusts the in-focus position so as to focus on one of the objects.

On the other hand, when the difference between the in-focus position for each of the main objects in the periphery of the screen and the in-from focus position for the main object at the center of the screen is different from each other at step S206, the flow proceeds to step S207. Then at step S207, the calculation unit 112 calculates (adjusts) the in-focus position so as to obtain the in-focus position for averagely exhibiting good resolution at the positions of the main objects and to have the depths of field of the main objects largely overlap each other. In other words, when the determination unit 110 determines that the objects exist in the screen and the in-focus position difference for each of the objects is not within the predetermined range, the calculation unit 112 calculates (adjusts) a final in-focus position based on the in-focus position for each of the objects. For example, the calculation unit 112 sets an average value of the in-focus positions of the respective objects as the final in-focus position. Then, the focus control unit 113 performs the in-focus control based on the calculated in-focus position. Typically, the determination of an object is based on the size of the object, the distance to the object, and the like. For example, an object is determined to be an main object when it has a size larger than a predetermined size and smaller than a predetermined size and its distance is within a predetermined value. Thus, a plurality of objects determined to be main objects are within a predetermined distance. At step S208, while the shutter switch SW2 of the image pickup apparatus 100 is off, the operation described above is repeated. Then, when the shutter switch SW2 of the image pickup apparatus 100 is turned on, the in-focus position is adjusted based on the number of the main objects and the positions thereof on the screen so as to exhibit good resolution of the main objects, and the image capturing is performed.

Figure 3:
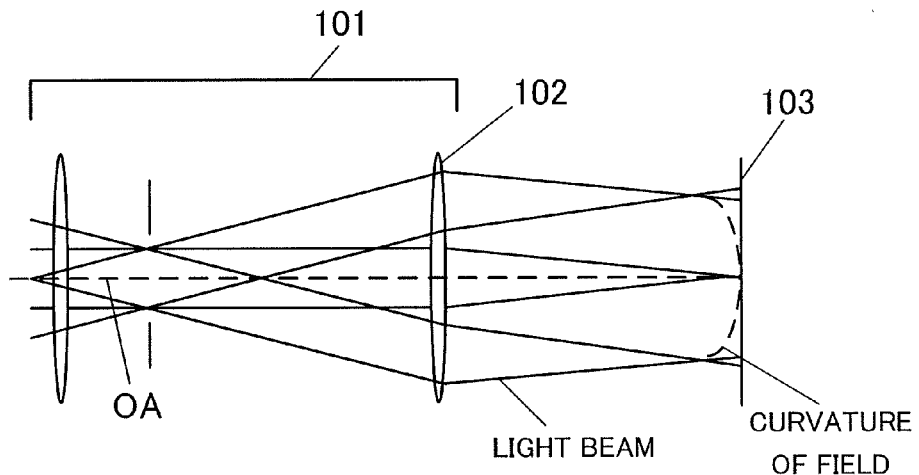
FIG. 3 is a diagram illustrating a relation between the curvature of field of an image pickup optical system and the image pickup element in the present embodiment.

FIG. 3 is a diagram illustrating a relation between the in-focus position of the image pickup optical system 101 and the position of the image pickup element 103 when the image pickup optical system 101 has the curvature of field. When the image pickup optical system 101 has the curvature of field, the in-focus position of the image pickup optical system 101 does not form a flat plane. Therefore, on the image pickup element 103, some positions coincide with the in-focus position while other positions do not coincide with the in-focus position. In FIG. 3, a light beam condensed at the center of the image pickup element 103 by the image pickup optical system 101 is focused at the in-focus position. On the other hand, a light beam condensed at a peripheral portion of the image pickup element 103 by the image pickup optical system 101 is focused off the in-focus position. Thus, good resolution can be obtained at the center of the image pickup element 103, but the resolution degrades at the peripheral portion of the image pickup element 103. The in-focus position is adjusted by moving the focus lens 102, which performs focusing of the image pickup optical system 101, in a direction of an optical axis OA (optical axis direction) of the image pickup optical system 101.

Figure 4:
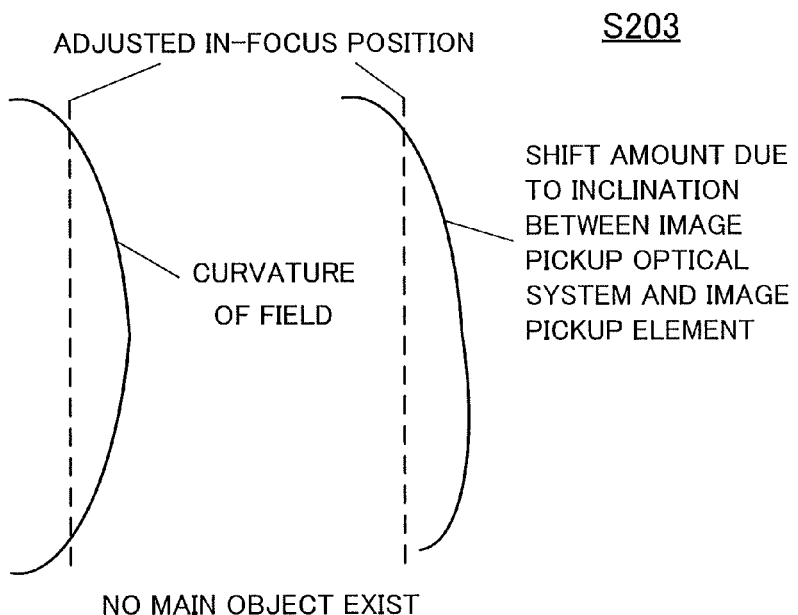
FIG. 4 is a diagram illustrating a relation between an image plane and the in-focus position when no main object exists in the present embodiment.

FIG. 4 is a diagram illustrating a relation between the image plane (the curvature of field) and the in-focus position when no main object exists, and illustrates the adjustment of the in-focus position at step S203 in FIG. 2. In this case, the determination unit 110 determines that no main object exists in the screen. It is thus determined that a photographer wants to obtain an averaged resolution over the entire screen rather than to improve the resolution of a particular region in the screen. For example, in scenery image capturing, an averaged resolution over the entire screen is preferable rather than a good resolution for a particular object. In such a situation, as illustrated in FIG. 3, adjusting the in-focus position so as to put the in-focus position at the center of the screen obtains good resolution at the center of the screen and degraded resolution at the peripheral portion of the screen due to the distance from the in-focus position. It is thus preferable to take into account the curvature of field of the image pickup optical system 101 at the center of the screen and the peripheral portion of the screen and a difference in the in-focus position due to the positional difference (shift) of the image plane between at the center of the screen and the peripheral portion of the screen caused by the inclination between the image pickup optical system 101 and the image pickup element 103. In the present embodiment, the in-focus position is adjusted so that the in-focus position for the entire screen is averagely apart (shifted) from the image pickup element 103. In other words, the in-focus position is adjusted so that the in-focus position of each object in the entire screen is within a predetermined range from the image pickup element 103. Adjusting the in-focus position in this manner can reduce a resolution difference between at the center of the screen and the peripheral portion of the screen and can obtain an averaged resolution over the entire screen.

Figure 5:
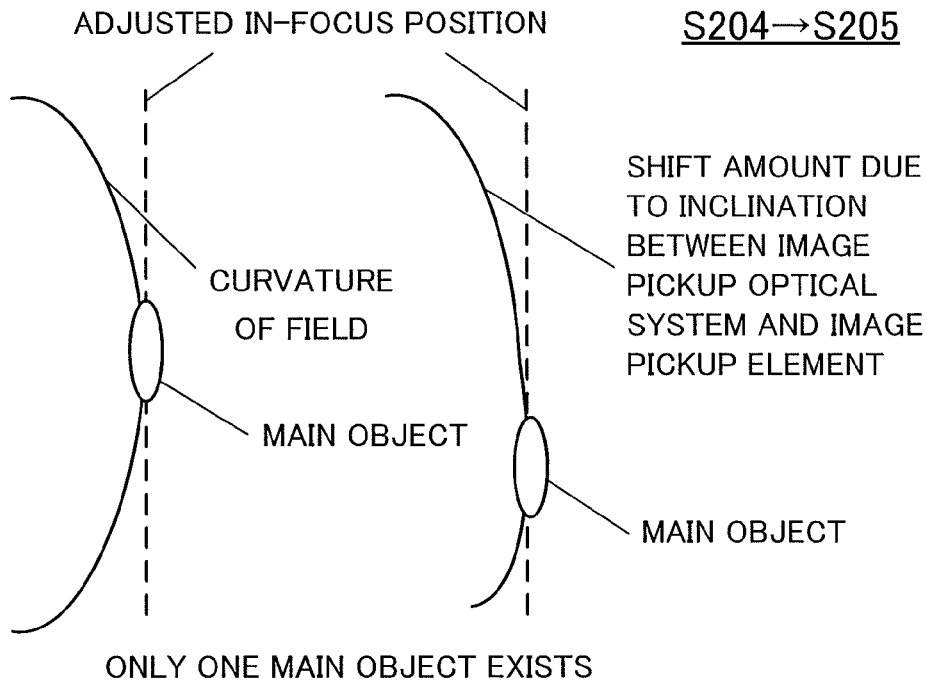
FIG. 5 is a diagram illustrating the relation between the image plane and the in-focus position when only one main object exists in the present embodiment.

FIG. 5 is a diagram illustrating the relation between the image plane and the in-focus position when only one main object exists and illustrates the adjustment of the in-focus position in a case where the flow proceeds from step S204 to step S205 in FIG. 2. In this case, the determination unit 110 determines that only one main object exists in the screen. It is thus determined that the photographer wants to obtain best resolution for the one main object. In such a situation, regardless of a position at which this main object exists on the screen, the in-focus position is adjusted so that the best resolution is obtained at the position of the main object. Adjusting the in-focus position in this manner can obtain good resolution for the main object.

Figure 6:
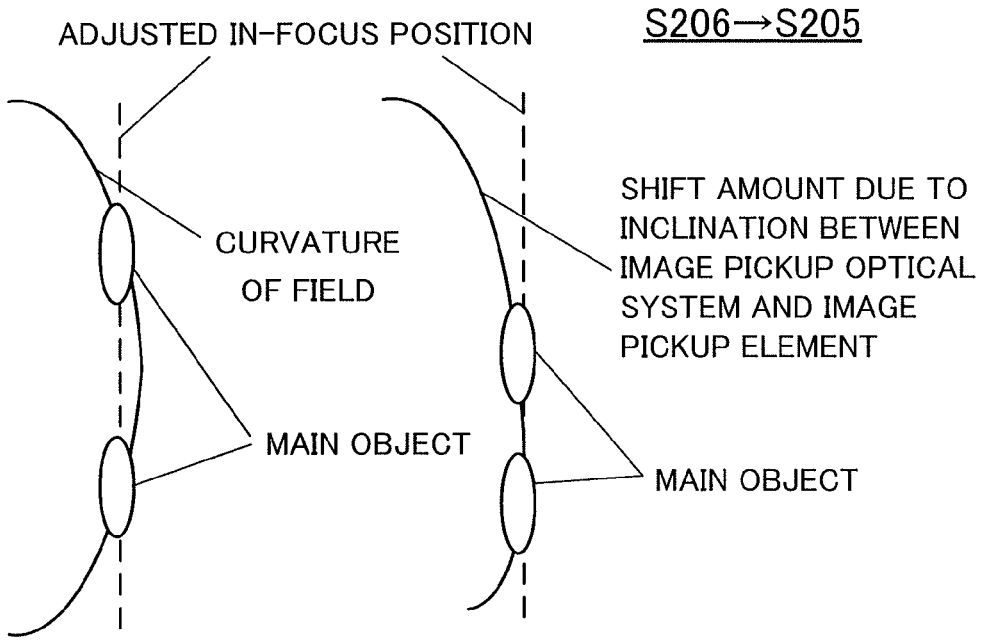
FIG. 6 is a diagram illustrating the relation between the image plane and the in-focus position when a plurality of main objects exist and a shift amount of the image plane is the same for each of the main objects in the present embodiment.

FIG. 6 is a diagram illustrating the relation between the image plane and the in-focus position when a plurality of main objects exist and the shift amount of the image plane is the same for each of the main objects, and illustrates the adjustment of the in-focus position in a case where the flow proceeds from step S206 to step S205 in FIG. 2. In this case, the determination unit 110 determines that the main objects exist in the screen. It is thus determined that the photographer wants to obtain good resolution averaged for each of the main objects. In addition, for each of the main objects in the screen, the determination unit 110 determines the shift amount of the in-focus position from the in-focus position for the center of the screen. In the case of FIG. 6, since the shift amount of the in-focus position at the position of each of the main objects from the in-focus position for the center of the screen is the same, the in-focus position is adjusted to a common in-focus position between the main objects. This obtains good resolution for each of the main objects.

Figure 7:
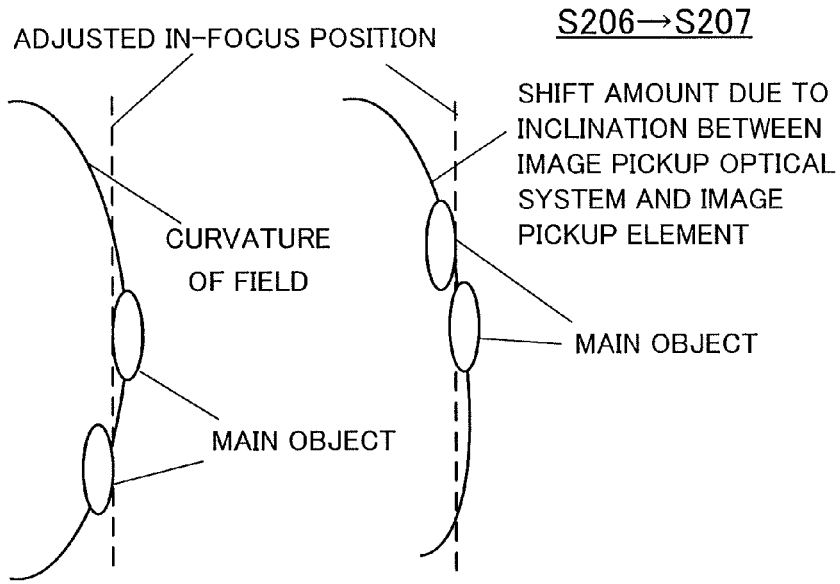
FIG. 7 is a diagram illustrating the relation between the image plane and the in-focus position when a plurality of main objects exist and the shift amount of the image plane is different for each of the main objects in the present embodiment.

FIG. 7 is a diagram illustrating the relation between the image plane and the in-focus position when a plurality of main objects exist and the shift amount of the image plane is different for each of the main objects, and illustrates the adjustment of the in-focus position in a case where the flow proceeds from step S206 to step S207 in FIG. 2. In this case, the determination unit 110 determines that the main objects exist in the screen. It is thus determined that the photographer wants to obtain good resolution averaged for each of the main objects. It is preferable to obtain good resolution averaged for each of the main objects rather than to degrade any of the main objects. Since the main objects are objects of which images the photographer wants to capture, the degradation of the resolution is not preferable for them. In addition, for each of the main objects in the screen, the determination unit 110 determines the shift amount from the in-focus position for each of the main objects. In the case of FIG. 7, the shift amount of the in-focus position at the position of each of the main objects from the in-focus position for the center of the screen is different for each of the main objects. Therefore, when the in-focus position is adjusted for one main object, good resolution is obtained for that main object, but the resolution degrades for the other main objects. Thus, to obtain good resolution averaged for each of the main objects, the in-focus position is adjusted so that the in-focus position for each of the main objects is averagely apart (averagely shifted) from the image pickup element 103. This can obtain good resolution for each of the main objects.

Figure 8:
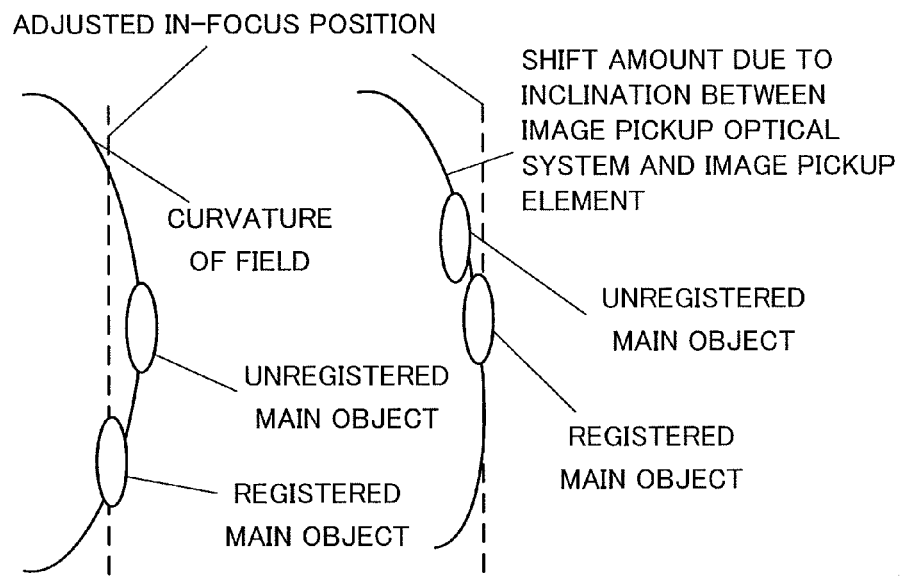
FIG. 8 is a diagram illustrating the relation between the image plane and the in-focus position when a plurality of main objects exist and any registered main object is included therein in the present embodiment.

FIG. 8 is a diagram illustrating the relation between the image plane and the in-focus position when a plurality of main objects exist and any registered main object is included therein. In this case, when the flow proceeds from step S206 to step S207 in FIG. 2, the determination unit 110 determines whether the previously registered main object exists. For example, when it is set to determine a person's face as a main object and any person's face registered by using a personal authentication function or the like exists in the screen, it is determined that the photographer wants to obtain good resolution for that registered person's face. Thus, the in-focus position is adjusted so that the best resolution is obtained at the position of the registered person's face. Specifically, the determination unit 110 determines whether any previously registered object exists among the objects existing in the screen. Then, when any previously registered object exists in the screen, the calculation unit 112 adjusts the in-focus position so as to focus on the previously registered object. Adjusting the in-focus position in this manner can obtain good resolution for the registered person's face. In the present embodiment, the in-focus position may be adjusted by weighting the in-focus position so that a resolution difference between a registered main object and an unregistered main object is less than a predetermined amount.

Figure 9:
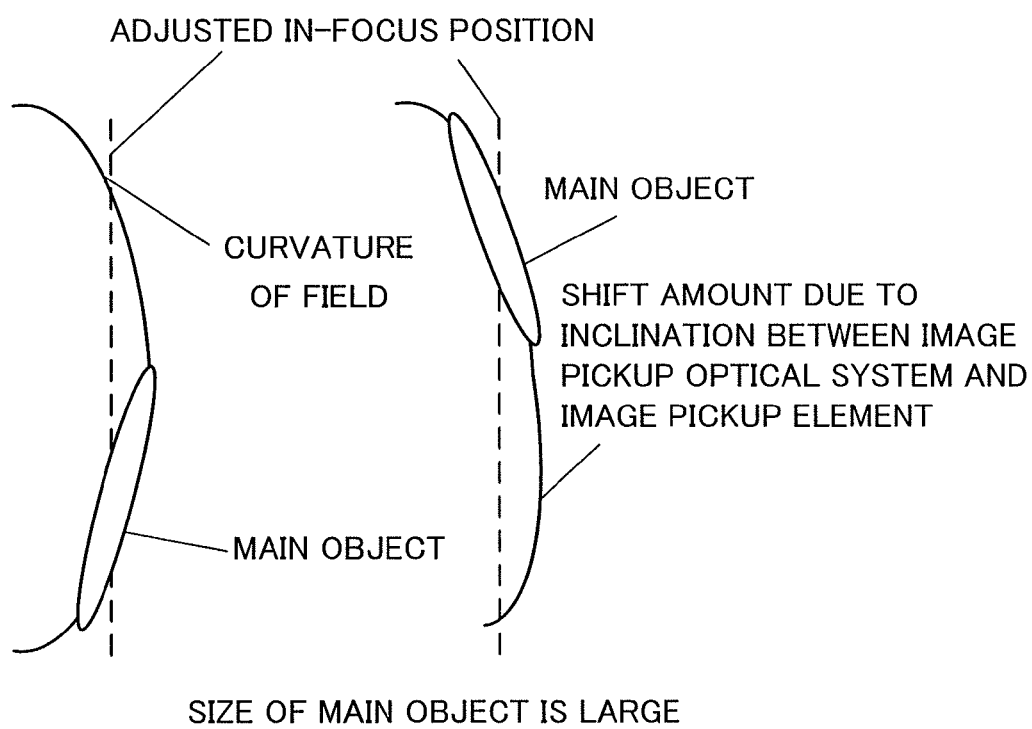
FIG. 9 is a diagram illustrating the relation between the image plane and the in-focus position when the size of a main object is large on the screen in the present embodiment.

Subsequently, referring to FIG. 9, processing when the size of a main object is large relative to the screen, which is not illustrated in the flowchart in FIG. 2, will be described. FIG. 9 is a diagram illustrating the relation between the image plane and the in-focus position when the size of the main object is large on the screen. When the main object covers a large area relative to the screen, the in-focus position varies depending on a position within the main object. In such a situation, it is determined that the photographer wants to obtain an averaged resolution over the entire main object rather than to obtain good resolution for a particular region within the main object. It is thus necessary to take into account the curvature of field of the image pickup optical system 101 at the center of the screen and the peripheral portion of the screen and the difference in the in-focus position due to the positional difference of the image plane between at the center of the screen and the peripheral portion of the screen caused by the inclination between the image pickup optical system 101 and the image pickup element 103. Then, the in-focus position is adjusted so that the in-focus position for the entire screen is averagely apart (shifted) from the image pickup element 103. In other words, the determination unit 110 determines the size of the object in the screen, and the calculation unit 112 adjusts the in-focus position depending on the size of the object. The calculation unit 112 may change weighting of the adjustment amount of the in-focus position depending on the size of the object. Adjusting the in-focus position in this manner can reduce a resolution difference between at the center of the screen and the peripheral portion of the screen and obtain an averaged resolution over the entire main object.

In addition, the operation in which the calculation unit 112 calculates the in-focus position based on the determination result of the determination unit 110 may be set to be performed only when the photographer sets a main object determination function to be activated (sets a predetermined shooting mode). In this case, the calculation unit 112 decides whether to calculate the in-focus position based on information of the object depending on the shooting mode set by the photographer. In many cases when the photographer sets the main object determination function not to be activated, the photographer wants to obtain an averaged resolution over the entire screen rather than to obtain good resolution for a particular object. Thus, when the main object determination function is not set to be activated, as illustrated in FIG. 4, an averaged resolution over the entire screen may be set to be obtained by reducing the resolution difference between at the center of the screen and the peripheral portion of the screen.

The present embodiment allows the adjustment amount (correction amount) of the in-focus position to be changed depending on the number of main objects and the positions thereof on the screen when image capturing is performed with the main object determination while there exists a focus difference caused by a curvature of field and inclination between an image pickup optical system and an image pickup surface. Thus, when the image capturing is performed with the main object determination, an image exhibiting good resolution for the main object can be captured. In addition, determining the size of the main object and whether the main object is a previously registered object and thereby adjusting (correcting) the in-focus position depending on the determination result allow image capturing to be performed more as intended by the photographer. The present embodiment can provide an image pickup apparatus, an image pickup system, a method of controlling the image pickup apparatus, and a non-transitory computer-readable storage medium that are capable of setting an in-focus position appropriate for the state of a main object on the screen.

[Other Embodiments]

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-193480, filed on Sep. 18, 2013 and Japanese Patent Application No. 2014-177163, filed on Sep. 1, 2014, which are hereby incorporated by reference herein in their entirety.

What is claimed is:

1. An image pickup apparatus comprising:
   an image pickup element configured to perform photoelectric conversion on an optical image obtained through an image pickup optical system to generate an image signal;
   a processor performing the functions of a focus detention unit, a determination unit, a calculation unit and a control unit, wherein
   the focus detection unit configured to perform focus detection based on the image signal;
   the determination unit is configured to determine an object image in an image based on the image signal;
   the calculation unit is configured to calculate an in-focus position based on information of the object image determined by the determination unit; and
   the control unit is configured to perform in-focus control based on the in-focus position calculated by the calculation unit,
   wherein the calculation unit is configured to, when the determination unit determines that a plural object images exist in the image based on the image signal and each of the in-focus positions of the plural object images is within a predetermined range, adjust the in-focus position to perform the in-focus control so as to focus on one of the plural object images, and
   wherein the calculation unit is configured to, when the determination unit determines that the plural object images exist in the image based on the image signal and each of the in-focus positions of the plural object images is not in the predetermined range , adjust the in-focus position to perform the in-focus control based on each of the in-focus positions of the plural object images that is in the predetermined range and also based on each of the in-focus positions of the plural object images not in the predetermined range.

2. The image pickup apparatus according to claim 1, wherein:

the determination unit is configured to determine a position of the object image existing in the image based on the image signal and the number of the plural object images, and the calculation unit is configured to adjust the in-focus position based on the position of the object image and the number of the plural object images.

3. The image pickup apparatus according to claim 1, wherein the calculation unit is configured to adjust a difference between an imaging position of the image pickup optical system as the in-focus position in the image based on the image signal and a position of the image pickup element, the difference being caused by a curvature of field of the image pickup optical system.

4. The image pickup apparatus according to claim 1, wherein the calculation unit is configured to adjust a difference between an imaging position of the image pickup optical system as the in-focus position in the image based on the image signal and a position of the image pickup element, the difference being caused by inclination of the image pickup element with respect to the image pickup optical system.

5. The image pickup apparatus according to claim 1, wherein the calculation unit is configured to, when the determination unit determines that only one object image exists in the image based on the image signal, adjust the in-focus position so as to focus on the one object image.

6. The image pickup apparatus according to claim 1, wherein the calculation unit is configured to, when the determination unit determines that no object exists in the image based on the image signal, adjust a difference between an imaging position of the image pickup optical system and a position of the image pickup element so as to move the in-focus position in a direction from an in-focus position at a central portion of the image based on the image signal to an in-focus position at a peripheral portion of the image based on the image signal.

7. The image pickup apparatus according to claim 1, wherein the calculation unit is configured to set an average value of the in-focus positions of the plural object images as the final in-focus position to perform the in-focus control.

8. The image pickup apparatus according to claim 1, wherein the calculation unit is configured to determine whether to calculate the in-focus position based on information of the object image, depending on a shooting mode set by a photographer.

9. The image pickup apparatus according to claim 1, wherein:
the determination unit is configured to determine a size of the object image in the image based on the image signal, and
the calculation unit is configured to adjust the in-focus position depending on the size of the object image.

10. The image pickup apparatus according to claim 9, wherein the calculation unit is configured to change weighting of an adjustment amount of the in-focus position depending on the size of the object image.

11. The image pickup apparatus according to claim 1, wherein:
the determination unit is configured to determine whether a previously registered object image exists among the plural object images existing in the image based on the image signal, and the calculation unit is configured to adjust the in-focus position so as to focus on the previously registered object image when the previously registered object image exists in the image based on the image signal.

12. The image pickup apparatus according to claim 1, wherein the object image is a person's face.

13. An image pickup system comprising:
an image pickup optical system; and
an image pickup apparatus,
wherein the image pickup apparatus includes:
an image pickup element configured to perform photoelectric conversion on an optical image obtained through the image pickup optical system to generate an image signal,
a focus detection unit configured to perform focus detection based on the image signal,
a determination unit configured to determine an object image in an image based on the image signal,
a calculation unit configured to calculate an in-focus position based on information of the object image determined by the determination unit, and
a control unit configured to perform in-focus control based on the in-focus position calculated by the calculation unit,
wherein the calculation unit is configured to, when the determination unit determines that a plural object images exist in the image based on the image signal and each of the in-focus positions of the plural object images is within a predetermined range, adjust the in-focus position to perform the in-focus control so as to focus on one of the plural object images, and
wherein the calculation unit is configured to, when the determination unit determines that the plural object images exist in the image based on the image signal and each of the in-focus positions of the plural object images is not in the predetermined range, adjust the in-focus position to perform the in-focus control based on each of the in-focus positions of the plural object images that is in the predetermined range and also based on each of the in-focus positions of the plural object images not in the predetermined range.

14. A method of controlling an image pickup apparatus, the method comprising the steps of:
performing photoelectric conversion on an optical image obtained through an image pickup optical system to generate an image signal;
performing focus detection based on the image signal;
determining an object image in an image based on the image signal;
calculating an in-focus position based on information of the object image; and
performing in-focus control based on the in-focus position,
wherein in the step of calculating the in-focus position, when in the step of determining the object image, it is determined that a plural object images exist in the image based on the image signal and each of the in-focus positions of the plural object images is within a predetermined range, the in-focus position to perform the in-focus control so as to focus on one of the plural object images is adjusted, and
wherein in the step of calculating the in-focus position, when in the step of determining the object image, it is determined that the plural object images exist in the image based on the image signal and each of the in-focus positions of the plural object images is not in the predetermined range, the in-focus position to perform the in-focus control is adjusted based on each of the in-focus positions of the plural object images that is in the predetermined range and also based on each of the in-focus positions of the plural object images not in the predetermined range.

15. The method according to claim 14, wherein:
a position of the object image existing in the image based on the image signal and the number of the plural object images are determined in the step of determining the object image, and
the in-focus position is adjusted depending on the position of the object image and the number of the plural object images in the step of calculating the in-focus position.

16. A non-transitory computer-readable storage medium storing a program which causes a computer to execute a method of controlling an image pickup apparatus, the method comprising:
performing photoelectric conversion on an optical image obtained through image pickup optical system to generate an image signal;
performing focus detection based on the image signal;
determining an object image in an image based on the image signal;
calculating an in-focus position based on information of the object image; and
performing in-focus control based on the in-focus position,
wherein in the step of calculating the in-focus position, when in the step of determining the object image, it is determined that a plural object images exist in the image based on the image signal and each of the in-focus positions of the plural object images is within a predetermined range, the in-focus position to perform the in-focus control so as to focus on one of the plural object images is adjusted, and
wherein in the step of calculating the in-focus position, when in the step of determining the object image, it is determined that the plural object images exist in the image based on the image signal and each of the in-focus positions of the plural object images is not in the predetermined range, the in-focus position to perform the in-focus control is adjusted based on each of the in-focus positions of the plural object images that is in the predetermined range and also based on each of the in-focus positions of the plural object images not in the predetermined range.

17. The non-transitory computer-readable storage medium according to claim 16, wherein:
a position of the object image existing in the image based on the image signal and the number of the plural object images are determined in the step of determining the object image, and
the in-focus position is adjusted depending on the position of the object image and the number of the plural object images in the step of calculating the in-focus position.

* * * * *